(12) United States Patent
Janzen et al.

(10) Patent No.: US 12,330,250 B2
(45) Date of Patent: Jun. 17, 2025

(54) DEVICE AND METHOD FOR INSERTING AN AUXILIARY JOINING PART INTO A WORKPIECE, AND ARRANGEMENT

(71) Applicant: Arnold Umformtechnik GmbH & Co. KG, Forchtenberg-Ernsbach (DE)

(72) Inventors: Vitalij Janzen, Bad Mergentheim (DE); Julian Eder, Satteldorf (DE)

(73) Assignee: ARNOLD UMFORMTECHNIK GMBH & CO. KG, Forchtenberg-Ernsbach (DE)

( * ) Notice: Subject to any disclaimer, the term of this patent is extended or adjusted under 35 U.S.C. 154(b) by 144 days.

(21) Appl. No.: 18/023,134

(22) PCT Filed: Aug. 9, 2021

(86) PCT No.: PCT/EP2021/072127
§ 371 (c)(1),
(2) Date: Feb. 24, 2023

(87) PCT Pub. No.: WO2022/043037
PCT Pub. Date: Mar. 3, 2022

(65) Prior Publication Data
US 2024/0238921 A1    Jul. 18, 2024

(30) Foreign Application Priority Data
Aug. 27, 2020   (DE) ................ 10 2020 210 839.0

(51) Int. Cl.
*B23P 19/06* (2006.01)
*B21J 15/02* (2006.01)
*B21J 15/36* (2006.01)

(52) U.S. Cl.
CPC ........... *B23P 19/062* (2013.01); *B21J 15/025* (2013.01); *B21J 15/36* (2013.01)

(58) Field of Classification Search
CPC ......... B23P 19/062; B21J 15/025; B21J 15/36
See application file for complete search history.

(56) References Cited

U.S. PATENT DOCUMENTS

| 2,750,660 A | 6/1956 | Newcomb |
| 11,578,751 B2 | 2/2023 | Donhauser |

(Continued)

FOREIGN PATENT DOCUMENTS

| DE | 102006019231 A1 | 11/2007 |
| DE | 202019002530 U1 | 8/2019 |

(Continued)

OTHER PUBLICATIONS

English translation WO 2011009850 (Year: 2011).*

(Continued)

*Primary Examiner* — Jason L Vaughan
*Assistant Examiner* — Amanda Kreiling
(74) *Attorney, Agent, or Firm* — FLYNN THIEL, P.C.

(57) ABSTRACT

A device for inserting an auxiliary joining part into a workpiece, having a punch pressing the joining part into a top of the workpiece. The joining part has a shaft pressed into the workpiece and a die contacting a bottom of the workpiece while the joining part is pressed in. The die has a contact region and non-circular aperture surrounded thereby. Radially outermost points of the aperture periphery lie on an imaginary circumscribed circle, and radially innermost points lie on an imaginary inscribed circle. The aperture periphery includes three projections protruding into and touching the circumscribed circle. A diameter of the inscribed circle is between 4% and 10% smaller than a maximum diameter of a circular circumference of the auxiliary joining part, and a diameter of the circumscribed circle is between 2% and 5% larger than this diameter.

22 Claims, 11 Drawing Sheets

(56) References Cited

U.S. PATENT DOCUMENTS

Figure 1:
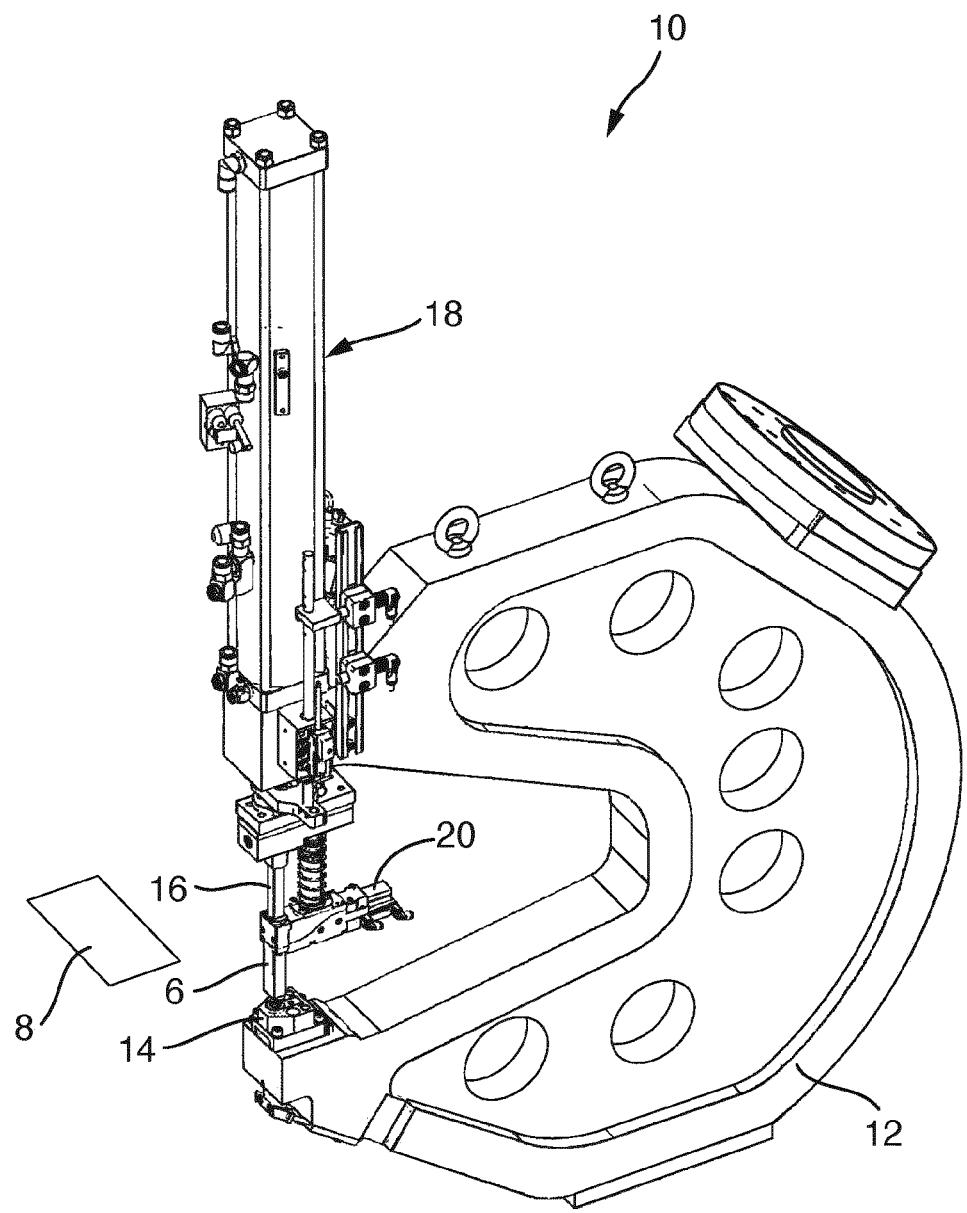

2007/0253770 A1   11/2007  Strempel
2019/0338804 A1   11/2019  Donhauser

FOREIGN PATENT DOCUMENTS

| DE | 102019110635 A1 | 11/2019 | |
|---|---|---|---|
| EP | 2226520 A2 | 9/2010 | |
| EP | 2674234 A2 | 12/2013 | |
| EP | 3564545 A1 | 11/2019 | |
| WO | WO-2011009850 A1 * | 1/2011 | .............. B21J 15/02 |

OTHER PUBLICATIONS

International Search Report with English Translation issued in corresponding International Application No. PCT/EP2021/072127 date of mailing Nov. 24, 2021 (8 pages).
Written Opinion of International Searching Authority issued in corresponding International Application No. PCT/EP2021/072127 dated Nov. 24, 2021 (8 pages).
German Office Action issued in corresponding German Application No. 10 2020 210 839.0 date of mailing Mar. 10, 2022 (5 pages).
German Search Report issued in corresponding German Application No. 10 2020 210 839.0 date of mailing Feb. 3, 2021 (6 pages).

* cited by examiner

DEVICE AND METHOD FOR INSERTING AN AUXILIARY JOINING PART INTO A WORKPIECE, AND ARRANGEMENT

The invention relates to a device for inserting an auxiliary joining part into a workpiece, the device having a punch for pressing the auxiliary joining part into a top side of the workpiece, wherein the auxiliary joining part has a shaft, which is to be pressed into the workpiece and which has a circular circumference with a first, maximum diameter; and having a die for coming into contact with a bottom side of the workpiece while the auxiliary joining part is being pressed in, wherein the die comprises a contact region and an aperture surrounded by the contact region, wherein a periphery of the aperture does not have a circular shape, wherein radially outermost portions of the periphery of the aperture lie on an imaginary circumscribed circle and wherein radially innermost portions of the periphery of the aperture lie on an imaginary inscribed circle, wherein the periphery of the aperture comprises at least three projections protruding into the circumscribed circle of the aperture and wherein the projections touch the inscribed circle.

International laid-open specification WO 2011/009850 A1 discloses a device for inserting an auxiliary joining part into a workpiece. The auxiliary joining part has a circular circumference with a head and a punching portion. The auxiliary joining part is pressed into an unperforated metal sheet by means of a punch. In the process, a peripheral punching edge of the auxiliary joining part punches a slug out of the workpiece. A die, which has an aperture and a flat contact region surrounding the aperture, comes into contact with a bottom side of the workpiece. The aperture is in the form of a through-opening and receives the punch slug that is produced when the auxiliary joining part is being pressed in. The aperture has three projections protruding into an imaginary circumscribed circle of the aperture. An outside diameter of the auxiliary joining part in the punching portion corresponds to the diameter of the circumscribed circle of the aperture. The projections touch an imaginary inscribed circle which is smaller than the outside diameter of the punching portion of the auxiliary joining part. When the auxiliary joining part is being pressed in, the projections deform certain portions of the punching edge of the auxiliary joining part. This forms an undercut between the auxiliary joining part and the workpiece. The auxiliary joining part serves to fasten further workpieces. For example, a steel auxiliary joining part is punched into an aluminum sheet and fastened there. A further steel workpiece can then be welded to the auxiliary joining part. A problem with inserting auxiliary joining parts into workpieces by means of a punch and dies is that it is generally not possible to exactly center the auxiliary joining part in relation to the die. Specifically in the case of series manufacture, what is referred to as a center offset between the auxiliary joining part and the die occurs. Such a center offset can lead to the auxiliary joining part no longer being fastened securely in the workpiece.

The invention intends to improve a device for inserting an auxiliary joining part into a workpiece, a method and an arrangement to the effect that a center offset between the auxiliary joining part and the die does not lead to disadvantages in terms of the anchoring of the auxiliary joining part in the workpiece.

According to the invention, what is provided is a device for inserting an auxiliary joining part into a workpiece, the device having a punch for pressing the auxiliary joining part into a top side of the workpiece, wherein the auxiliary joining part has a shaft, which is to be pressed into the workpiece and has a circular circumference with a first, maximum diameter; and having a die for coming into contact with a bottom side of the workpiece while the auxiliary joining part is being pressed in, wherein the die comprises a contact region and an aperture surrounded by the contact region, wherein a periphery of the aperture does not have a circular shape, wherein radially outermost points of the periphery of the aperture lie on an imaginary circumscribed circle and wherein radially innermost points of the periphery of the aperture lie on an imaginary inscribed circle, wherein the periphery of the aperture comprises at least three projections protruding into the circumscribed circle of the aperture and wherein the projections touch the inscribed circle, wherein a diameter of the inscribed circle is between 4% and 10% smaller than the first diameter of the auxiliary joining part, and wherein a diameter of the circumscribed circle is between 2% and 5% larger than the first diameter of the auxiliary joining part.

Surprisingly, skillfully dimensioning the aperture of the die in relation to the diameter of the auxiliary joining part has the effect that, with an increasing center offset of the auxiliary joining part in relation to the die, a larger area of overlap between the die and the auxiliary joining part is obtained. This makes it possible to have the effect that, in spite of a center offset, the auxiliary joining part is anchored securely in the workpiece. Indeed, the auxiliary joining part is then no longer anchored symmetrically, but since the area of overlap between the auxiliary joining part and the die becomes larger with an increasing center offset, secure anchoring of the auxiliary joining part is achieved nonetheless. This makes it possible to significantly improve the process reliability when the device is being used to insert an auxiliary joining part into a workpiece.

In a refinement of the invention, each projection is formed between two side boundaries that are part of the periphery of the aperture, wherein the side boundaries of each projection form an angle of 40° up to at most 180°.

In this respect, the angle is measured at the point of the projection that is innermost, and thus, for example, abuts the inscribed circle. For example, the angle is measured at the tip of a projection and the side boundaries then go away from this point.

In a refinement of the invention, the side boundaries of the projections are convex.

For example, the innermost point of the projection may be part of a curved line, in particular a portion of a circular line. In this special case, when the innermost point of the projection is part of a circular line, the angle between the two side boundaries of the projection amounts to 180°.

In a refinement of the invention, the side boundaries of each projection are concave.

In a refinement of the invention, the side boundaries are portions of a polylobular shape of the periphery of the aperture.

A polylobular shape denotes a non-circular shape, which has portions with a small radius and a large curvature and portions with a large radius and a small curvature, wherein the number of portions with a large curvature and a small curvature is the same and wherein a respective portion with a large curvature is disposed between two portions with a small curvature. For example, the polylobular shape has three regions with a large curvature and a small radius, and three regions with a small curvature and a large radius. In that case, the three regions with a large curvature and a small radius, as seen over the circumference, are spaced apart from one another by 60°, for example, as are the three regions with a small curvature and a large radius. The three regions with a large curvature and a small radius then touch the circumscribed circle, whereas the three regions with a small curvature and a large radius touch the inscribed circle of the aperture.

In a refinement of the invention, the periphery of the aperture is formed by multiple mutually adjacent portions of two polylobular circumferential lines.

Advantageously, the respective portions with a smaller radius and a larger curvature of the two polylobular circumferential lines are set against one another. In that case, the periphery of the aperture consists of multiple arcuate portions, which are set against one another and form a respective inwardly protruding projection at the joins.

In a refinement of the invention, a portion of the first polylobular circumferential line with a smaller radius and a larger curvature adjoins a portion of the second polylobular circumferential line with a larger radius and a smaller curvature.

The connection points between a respective portion of the first polylobular circumferential line and a respective portion of the second polylobular circumferential line touch the inscribed circle of the aperture and thereby form the innermost one of the projections. Projections that protrude inwards from the circumscribed circle of the aperture and have concave side boundaries are produced.

In a refinement of the invention, the first polylobular circumferential line and the second polylobular circumferential line are offset in relation to one another by a predefined angle, in particular 60°, about the center longitudinal axis of the aperture.

In a refinement of the invention, the two polylobular circumferential lines each have three regions with a large curvature and a small radius, and three regions with a small curvature and a large radius.

In a refinement of the invention, the two polylobular circumferential lines each have an imaginary circumscribed circle, wherein the diameters of the circumscribed circles are not the same.

In a refinement of the invention, the diameters of the circumscribed circles differ by 3% to 10%.

For example, the diameters of the circumscribed circles amount to 10.5 mm and 10.8 mm. It is advantageous in this case if the maximum diameter of the auxiliary joining part at the shaft amounts to 10.5 mm.

In a refinement of the invention, the side boundaries of each projection form an angle of greater than 150°.

In a refinement of the invention, a diameter of an imaginary circumscribed circle of the aperture is between 10 mm and 11.6 mm, and in particular amounts to 10.8 mm.

In a refinement of the invention, the aperture is in the form of a through-opening through the die and is provided to discharge a punch slug that is produced when the auxiliary joining part is being pressed in.

In a refinement of the invention, the periphery of the aperture can be sharp-edged, beveled or rounded. A sharp-edged periphery is formed at the transition between two in particular flat surfaces. A chamfer can form a beveled periphery. A radius of curvature leads to a rounded periphery.

In a refinement of the invention, the die has a ferrule, which faces toward the bottom side of the workpiece, the inner periphery of which forms the periphery of the aperture, and which protrudes beyond the rest of the top side of the die that faces toward the bottom side of the workpiece, is at the same height as the top side of the die, or is offset with respect to the top side of the die.

Such a ferrule makes it possible to achieve secure anchoring of the auxiliary joining part in the workpiece. The height of the ferrule in relation to the rest of the top side of the die that faces toward the bottom side of the workpiece amounts to 0.3 mm, for example, and is advantageously in a range between 0.1 mm and 1 mm. Within the scope of the invention, the ferrule may also be flush with the top side of the die or lie below the top side of the die.

In a refinement of the invention, a height, or a level, of the ferrule, as seen over its circumference, is constant and a width of the ferrule, as measured in a radial direction parallel to the top side of the die, varies over the circumference.

A width of the ferrule varies, for example, between 0.4 mm and 1 mm.

In a refinement of the invention, an outer periphery of the ferrule is circular.

The invention also relates to a method for inserting an auxiliary joining part into a workpiece by means of a device according to the invention, wherein the following steps are provided: bringing a die into contact with a bottom side of the workpiece, placing the auxiliary joining part onto a top side of the workpiece, pressing the auxiliary joining part into the top side of the workpiece by means of a punch, punching a punch slug out of the workpiece by means of the auxiliary joining part while the auxiliary joining part is being pressed in, and deforming the auxiliary joining part by means of a contact region of the die.

The invention also relates to an arrangement having an auxiliary joining part and a device according to the invention.

Figure 2:
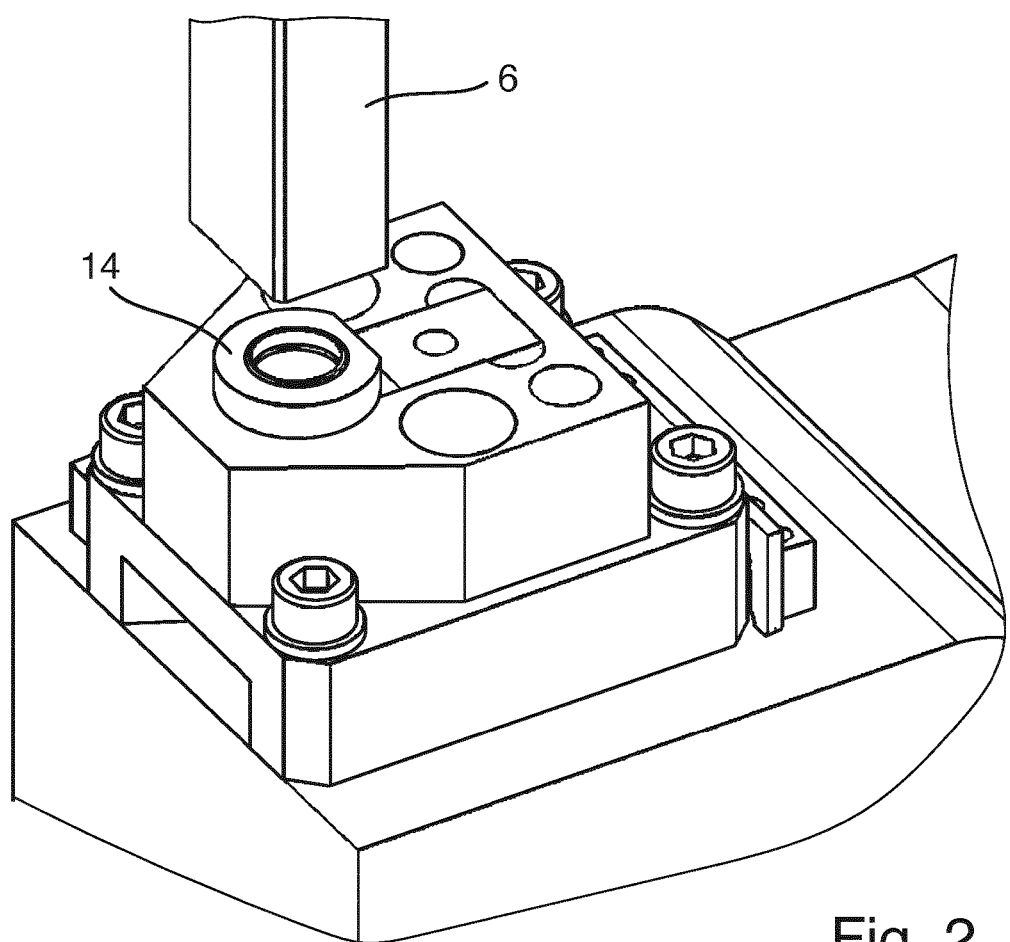
Figure 3:
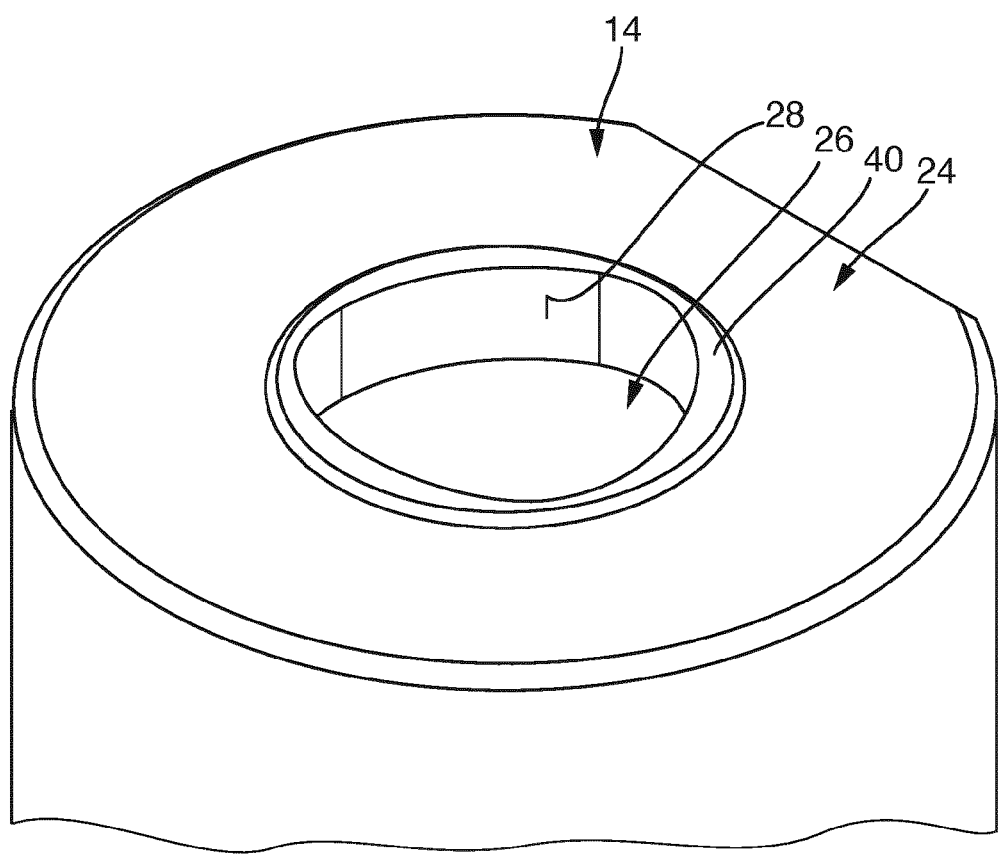
Figure 4:
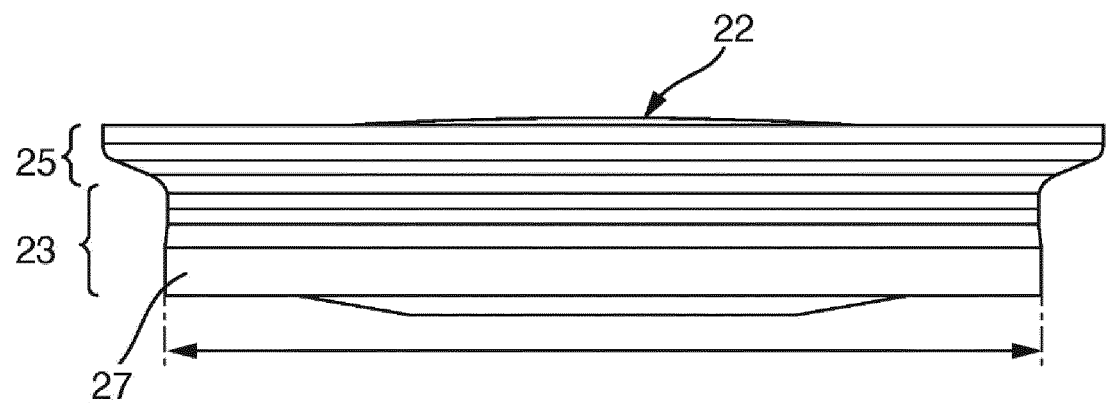
Figure 5:
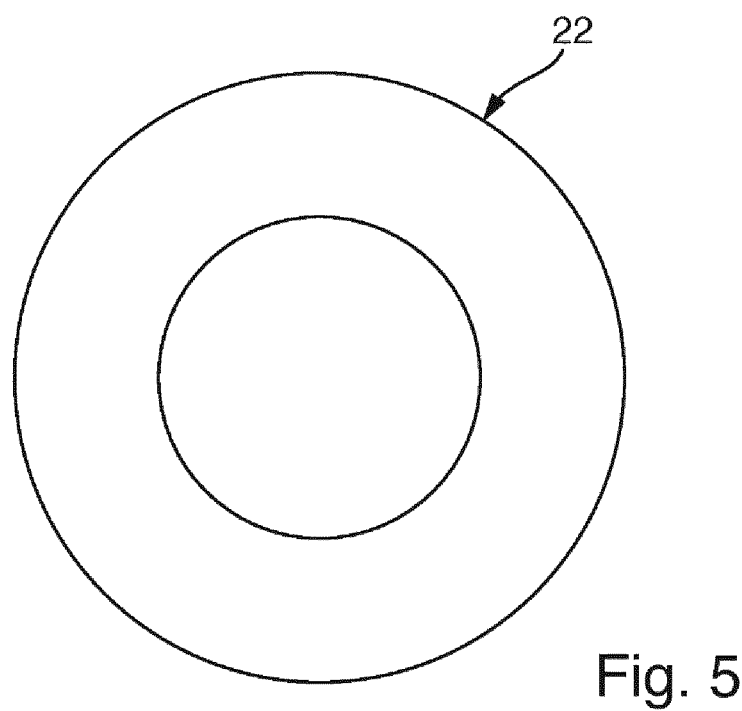
Figure 6:
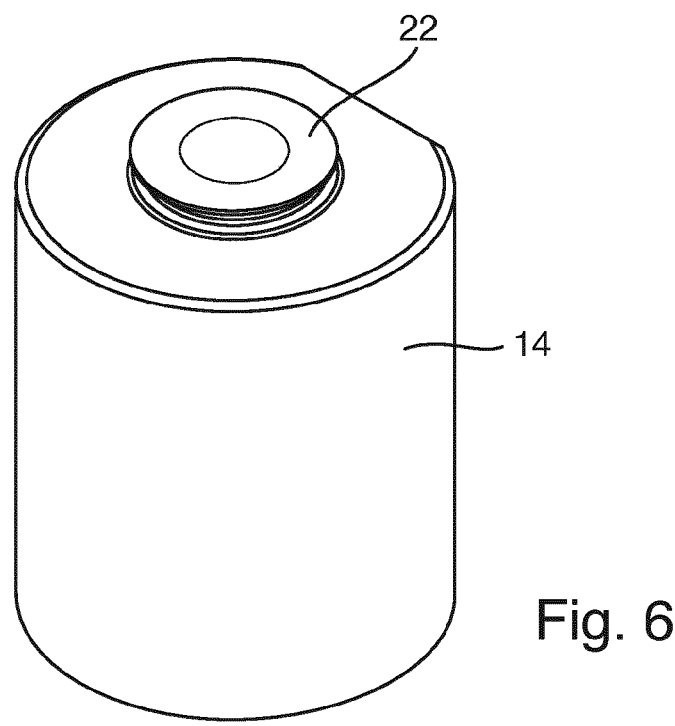
Figure 7:
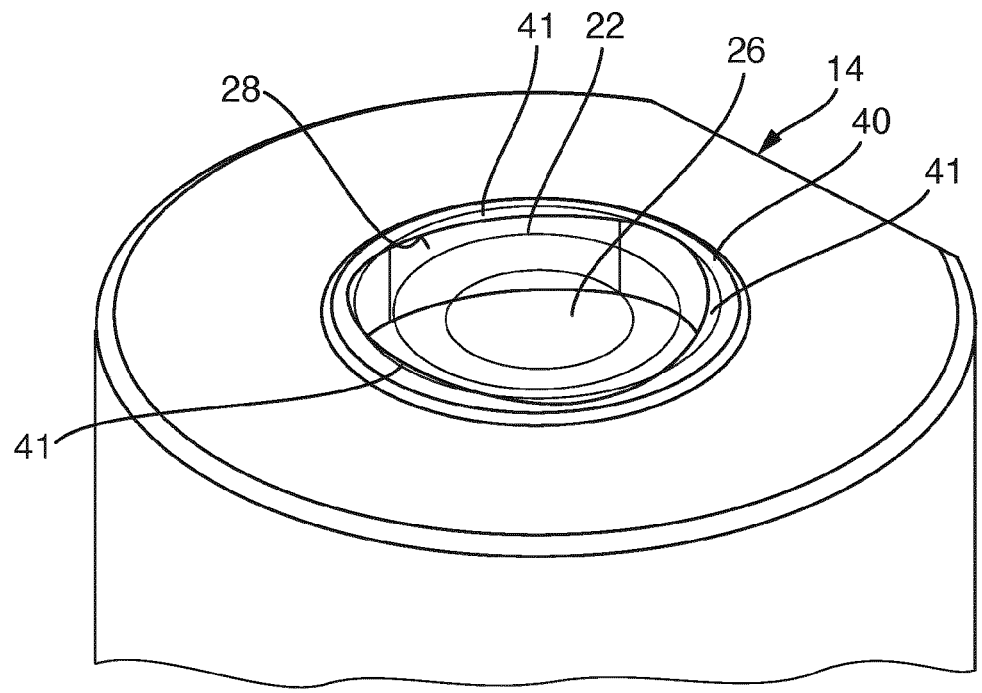
Figure 8:
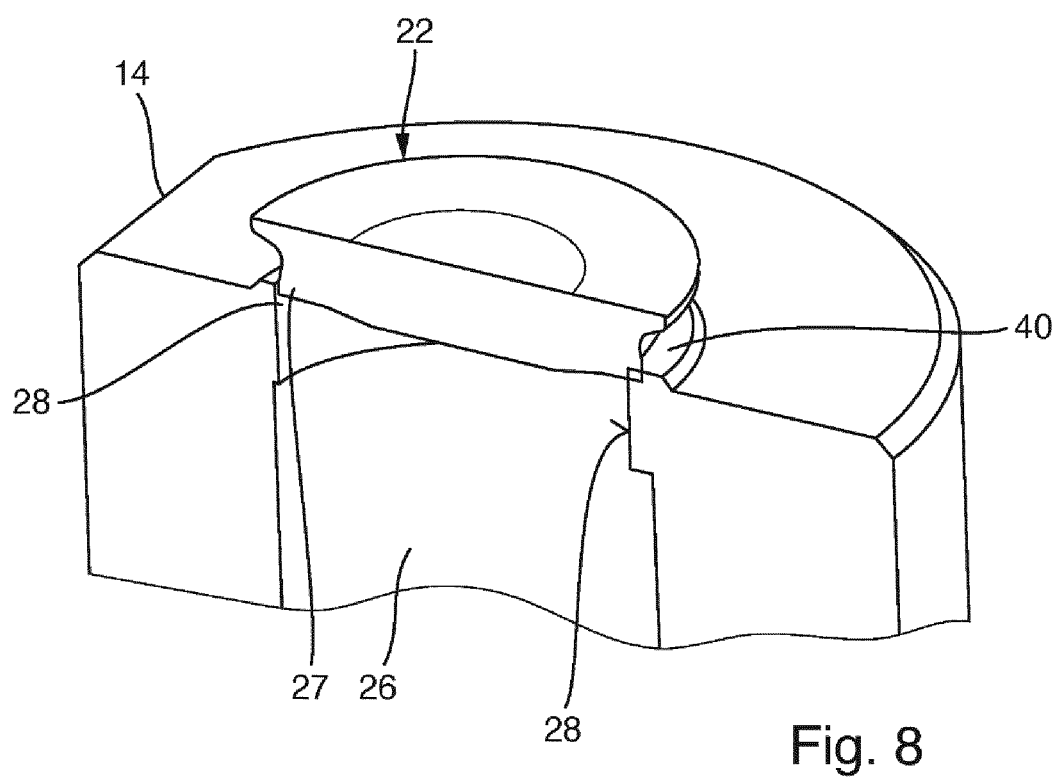
Figure 9:
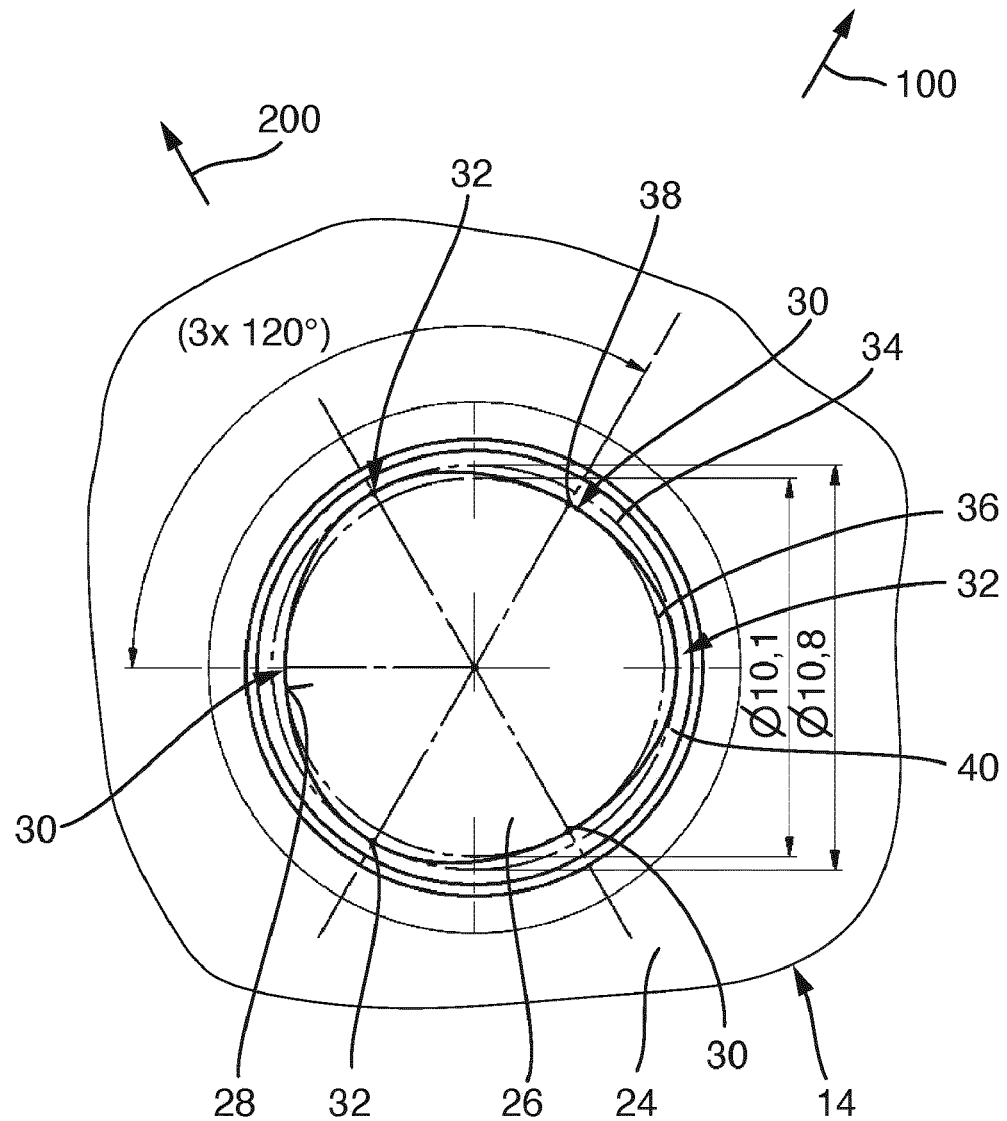
Figure 10:
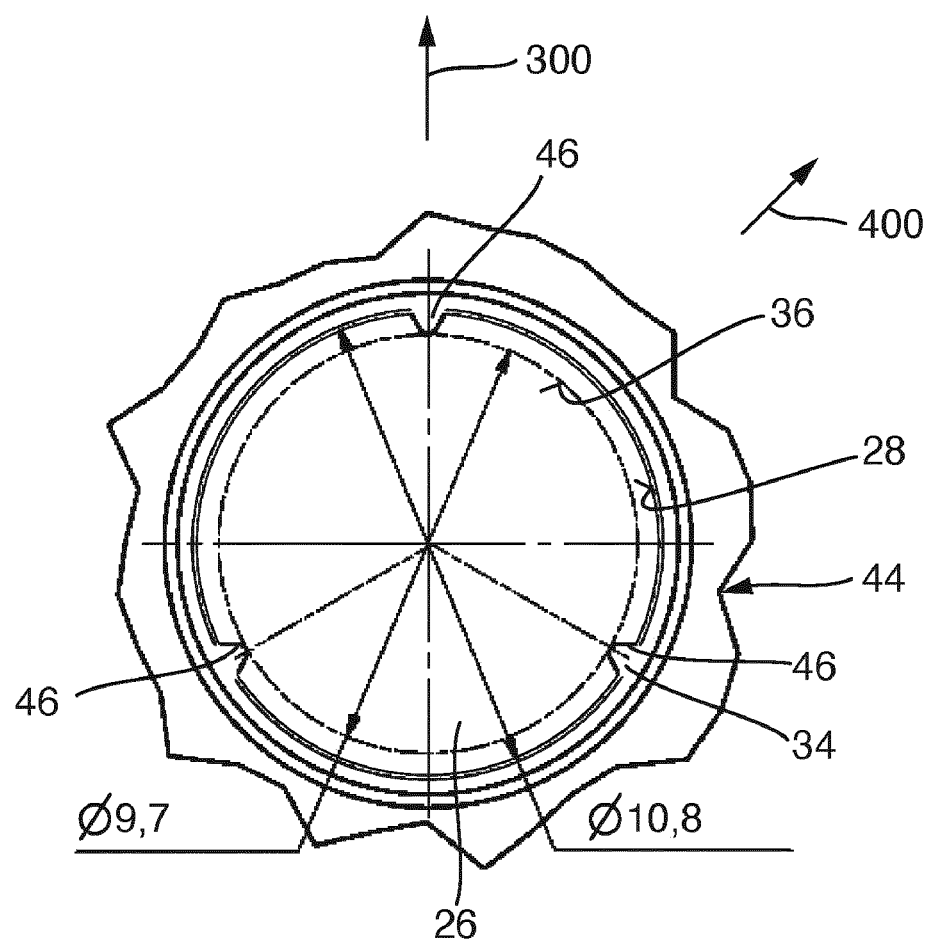
Figure 11:
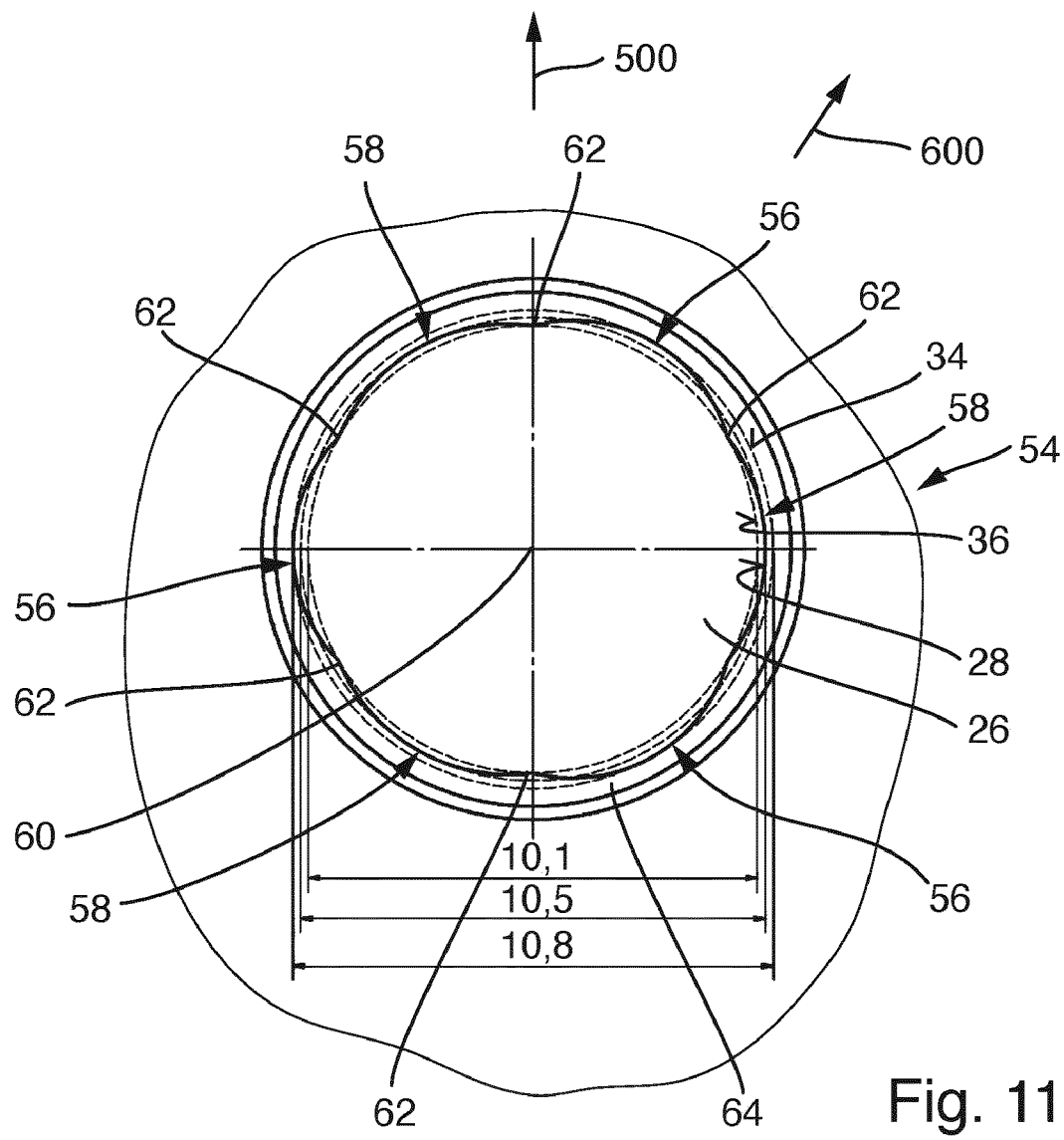
Figure 12:
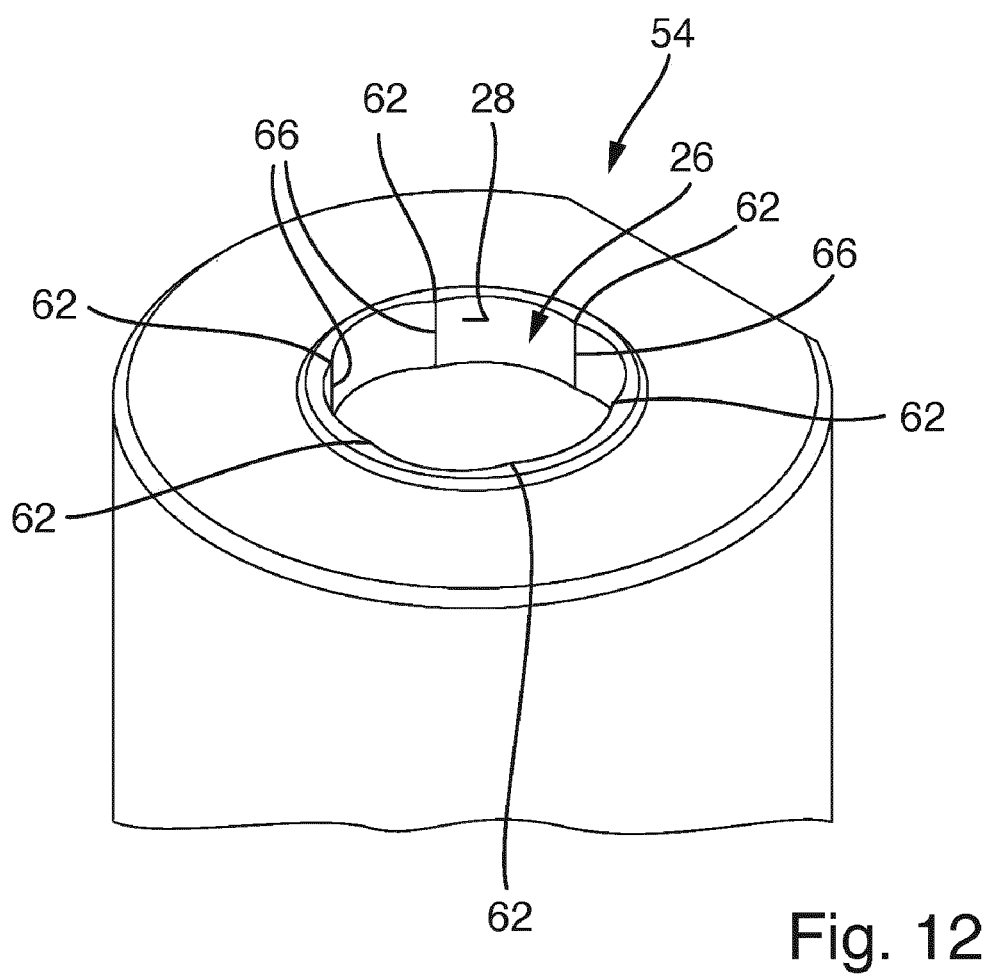
Figure 13:
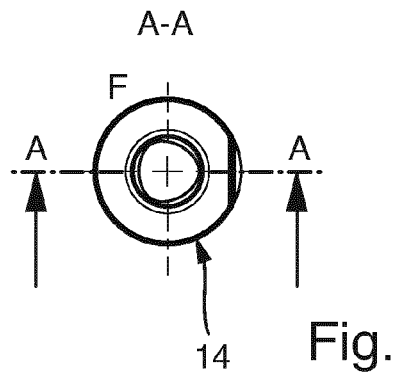
Figure 14:
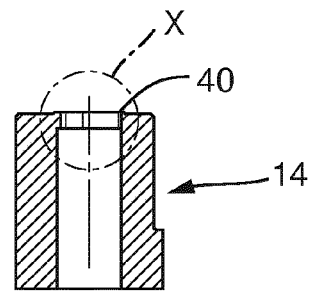
Figure 15:
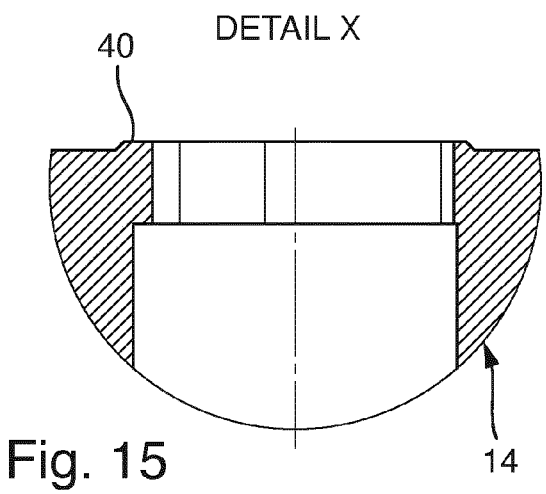
Figure 16:
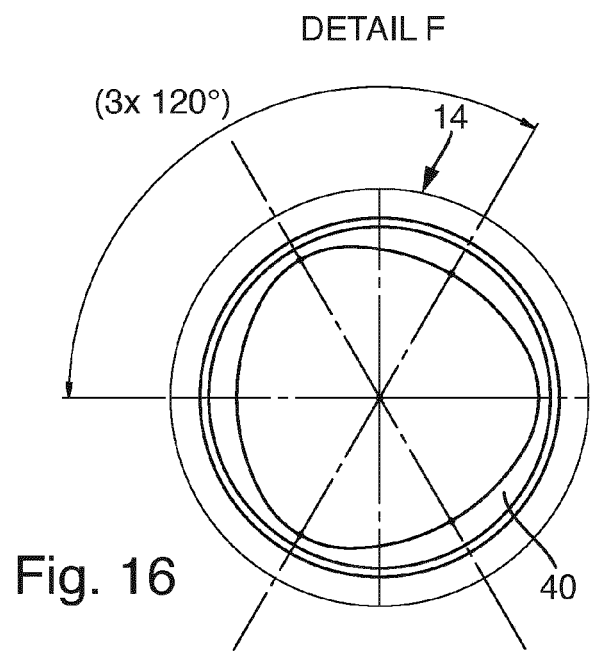

Further features and advantages of the invention will become apparent from the claims and from the following description of preferred embodiments of the invention in conjunction with the drawings. Individual features of the different embodiments which are presented and described can be combined in any desired way without going beyond the scope of the invention. This also applies to the combination of individual features without further individual features in conjunction with which they are shown or described. In the drawings:

FIG. 1 shows a partial illustration of a device according to the invention as per a first embodiment, FIG. 2 shows an enlarged detail of FIG. 1, FIG. 3 shows a further enlarged detail of the die 14 from FIG. 2, FIG. 4 shows a side view of an auxiliary joining part for use with the device according to the invention, FIG. 5 shows a plan view of the auxiliary joining part from FIG. 4, FIG. 6 shows a view, obliquely from above, of an auxiliary joining part and the die of the device from FIG. 1, FIG. 7 shows a schematic sectional view of the auxiliary joining part and the die from FIG. 6, FIG. 8 shows a further sectional view of the auxiliary joining part and the die from FIG. 6, FIG. 9 shows a partial plan view of the die from FIG. 3, FIG. 10 shows a plan view of a die according to a further embodiment of the invention, FIG. 11 shows a partial plan view of a die according to a further embodiment of the invention, FIG. 12 shows a partial view, obliquely from above, of the die from FIG. 11, FIG. 13 shows a plan view of the die from FIG. 3, FIG. 14 shows a view of the sectional plane A-A in FIG. 13, FIG. 15 shows an enlarged illustration of the detail X from FIG. 14, and FIG. 16 shows an enlarged illustration of the detail F from FIG. 13.

FIG. 1 partially shows a device 10 according to the invention for inserting an auxiliary joining part, which is not illustrated in FIG. 1, into a sheet-like workpiece 8, which is schematically illustrated in FIG. 1. The workpiece provided is generally metal sheet material. For example, a steel auxiliary joining part is inserted into an aluminum sheet, in order then to be able to fasten a further steel workpiece to the auxiliary joining parts by way of weld points, in order thereby to be able to connect the aluminum sheet to the further steel workpiece. The workpiece 8 is generally not preperforated.

The device 10 has a C clamp 12, which is connected to a machine base, not illustrated, bears a die 14 on its lower leg, illustrated in FIG. 1, and is connected to a punch 16 on its leg which is the upper one in FIG. 1. The punch 16 is actuated by means of a cylinder 18, for example a pneumatic cylinder, which is illustrated only partially in FIG. 1. An auxiliary joining part is fed by a feed device 20 and then pressed into the workpiece 8 by the punch 16. Before the auxiliary joining part is pressed in, the workpiece 8 is disposed between the die 14 and the punch 16.

FIG. 2 shows an enlarged detail of FIG. 1. The die 14, onto which the workpiece 8 is then placed, and a holding-down means 6, which is lowered onto the workpiece 8 after the workpiece 8 has been pushed in and then holds the workpiece 8 on the die 14, can be seen. A through-bore, in which the auxiliary joining part is then pushed by the punch 16 toward the workpiece 8, is provided in the holding-down means 6.

FIG. 3 partially shows the die 14 from FIG. 2. The die 14 has an aperture 26 with a periphery 28, wherein the periphery 28 is not circular but polylobular. In the embodiment illustrated, the periphery 28 is trilobular. This means that it has three regions with a large curvature, which are spaced apart from one another by 120°, and three regions with a small curvature, which are likewise spaced apart from one another by 120°. The regions with a large curvature adjoin one another. At the transitions, respective inwardly protruding projections or edges are formed, as can be seen in FIG. 3. The die 14 also has a contact region 24 with a raised ferrule 40. The ferrule 40 projects beyond the rest of the contact surface 24 and surrounds the aperture 26. An outer circumference of the ferrule 40 is circular, and an inner circumference of the ferrule 40 is formed by the periphery 28. Within the context of the invention, the ferrule 40 can project beyond the contact surface 24 forming certain portions of the top side of the die, be disposed at the same height as the contact surface 24, or be disposed below the contact surface 24.

FIG. 4 shows an auxiliary joining part 22, which can be pressed into a workpiece 8 by the device from FIG. 1. The auxiliary joining part 22 is circular and has a shaft 23 and a head 25. The head 25 has a larger diameter than the shaft 23. A punching portion 27, which is cylindrical and forms the maximum diameter of the shaft 23, of the auxiliary joining part 22 is provided at that end of the shaft 23 that is remote from the head 25. The diameter of the cylindrical, circular punching portion 27 is decisive for a deformation of the auxiliary joining part 22 at the end remote from the head by the die 14.

FIG. 5 shows a plan view of the auxiliary joining part 23.

FIG. 6 shows the die 14 with an auxiliary joining part 22 placed on the die 14. It can be seen that the auxiliary joining part 22 has the head 25 and the shaft 23, wherein the head 25 has a larger outer diameter than the shaft 23 and wherein both the head 25 and the shaft 23 have a circular outer circumference.

The auxiliary joining part 22 is pressed into the unperforated workpiece 8, specifically an unperforated metal sheet, by means of the punch 16. In the process, the auxiliary joining part 22 punches a through-opening in the workpiece by way of its shaft and a resulting punch slug is received in an aperture of the die 14. After a through-opening has been punched into the workpiece, a lower end of the shaft of the auxiliary joining part 22 comes into contact with the ferrule 40 of the die 14 and in so doing is plastically deformed by pressing the punch in further. This forms an undercut between the auxiliary joining part 22 and the workpiece, with the result that the auxiliary joining part is then securely connected to the workpiece.

A more detailed explanation of the insertion of an auxiliary joining part into a sheet-like workpiece can be found in international laid-open specification WO 2011/009850.

FIG. 7 shows a schematic side view of the die 14 and the auxiliary joining part 22 from FIG. 6. The sectional plane is directly above the ferrule 40. Here, the auxiliary joining part 22 and the sectional plane are shown as transparent, and therefore the outer circumference of the auxiliary joining part 22 in the punching portion 27 and the periphery 28 of the aperture 26 are illustrated in superposed fashion. It can be seen that the result is a total of three sickle-shaped areas of overlap 41 between the bottom side of the punching portion 27 and the ferrule 40. These areas of overlap lie radially on the outside of the portions of the periphery 28 with a small curvature. By contrast, in the regions of the periphery 28 with a large curvature, the outer circumference of the punching portion 27 of the auxiliary joining part 22 lies within the periphery 28 of the aperture. In these regions, the auxiliary joining part 22 is not deformed by the ferrule 40 as a result. Within the scope of the invention, the periphery 28 can be sharp-edged, beveled or rounded.

FIG. 7 shows the situation when the auxiliary joining part 22 is exactly centered in relation to the center longitudinal axis of the aperture 26 of the die 14. If, during series production, a center offset occurs between the auxiliary joining part 22 and the ferrule 40 of the die 14, it not being possible in principle to avoid this in all cases, the area of overlap between the auxiliary joining part 22 and the ferrule 40 becomes larger in terms of magnitude. The sickle-shaped overlap portions 41 are then no longer the same size, but have different sizes. However, the total area of overlap becomes larger, and therefore the auxiliary joining part is still reliably formed and the auxiliary joining part 22 is accordingly also securely anchored in the workpiece 8.

FIG. 8 shows a further side view of the die 14 and the auxiliary joining part 22 in the state from FIG. 6. In this context, in FIG. 6 the sectional plane runs through the center longitudinal axis of the aperture 26 of the die 14, from bottom left to top right in FIG. 6. In FIG. 8, the die 14 and the auxiliary joining part 22 have been rotated in order to present a better view of the sectional plane. It can be seen that, at that part of the periphery of the auxiliary joining part 22 that is on the left in FIG. 8, the punching portion 27 does not touch the periphery 28 of the aperture 26 and consequently lies within the periphery 28. By contrast, at that end of the auxiliary joining part 22 that is on the right in FIG. 8, it can be seen that the auxiliary joining part 22 rests on the ferrule 40 by way of the bottom side of the punching portion 27. FIG. 8 illustrates a slight penetration of the auxiliary joining part 22 and the ferrule 40, which serves only for illustration and would not occur in reality.

The maximum diameter of the shaft 23 of the auxiliary joining part 22, which is in the punching portion 27 in the embodiment illustrated, compare FIG. 4, is therefore between a maximum transverse dimension and a minimum transverse dimension of the periphery 28 of the aperture 26.

FIG. 9 shows a partial plan view of the die 14. The die 14 has the contact region 24, which surrounds the aperture 26. The aperture 26 is in the form of a through-opening, cf. also FIGS. 13 to 16, and has the polylobular periphery 28. The polylobular periphery 28 has three portions 30 which are spaced apart by 120° and have a large radius of curvature and a small curvature, and three portions 32 which are likewise spaced apart from one another by 120° and have a small radius of curvature and accordingly a large curvature. The portions 30 with a small curvature and the portions 32 with a large curvature are spaced apart from one another by 60°.

The periphery 28 of the aperture touches an imaginary circumscribed circle 34 of the aperture, wherein each outermost point of the portions 32 with a large curvature touches the circumscribed circle 34. In the embodiment illustrated, the imaginary circumscribed circle 34 has a diameter of 10.8 mm.

Each innermost point of the portions 30 with a small curvature touches an imaginary inscribed circle 36. As a result, the portions 30 with a small curvature form projections that protrude inward into the free space formed by the aperture 26. In the embodiment illustrated, the inscribed circle 36 has a diameter of 10.1 mm.

Each of the projections formed by the portions 30 has a point 38 that protrudes furthest into the interior space of the aperture 26. Side boundaries, which are concave in the case of the illustrated polylobular shape of the periphery of the aperture 26, are disposed on either side of this point 38. The two side boundaries, which taper toward the point 38, are at an angle of 180° in relation to one another at the point 38.

The die 14 is intended to insert an auxiliary joining part with a circular circumference, see the auxiliary joining part 22 from FIG. 2. In that case, an outside diameter at the shaft of the auxiliary joining part 22 lies between the diameters of the inscribed circle 36 and the circumscribed circle 34. In the embodiment illustrated, the diameter of the shaft of the auxiliary joining part 22 is 10.5 mm.

It can be seen that, when it is centered exactly in the middle, the auxiliary joining part 22 is deformed only by the portions 30 with a small curvature. The portions 32 with a large curvature, by contrast, lie largely outside the circumference of the auxiliary joining part.

This situation changes if the auxiliary joining part is no longer exactly centered in the middle in relation to the aperture 26. As is yet to be explained, the area of overlap between the auxiliary joining part and the die 14 becomes larger with an increasing center offset of a circular auxiliary joining part in relation to the die 14. This achieves reliable anchoring of the auxiliary joining part 22 in the workpiece even in the case of a center offset.

The die 14 has the ferrule 40, the inner boundary of which is formed by the periphery 28 of the aperture 26 and the outer circumference of which is circular. The ferrule 40, also see FIG. 14 and FIG. 15, is raised in relation to the rest of the contact surface 24 of the die 14. The height of the ferrule 40 in relation to the rest of the contact region 24 of the die 14 amounts to approximately 0.3 mm.

FIG. 10 shows a partial plan view of a die 44 according to a further embodiment of the invention. The die 44 has an aperture 26, which has a periphery 28 formed by three circular line portions, between which a respective radially inwardly protruding projection 46 is disposed. The three projections 46 are spaced apart from one another by 120°. The projections 46 touch an imaginary inscribed circle 36 by way of their point that protrudes furthest inward. A circumscribed circle 34 of the aperture 26 is formed by an imaginary circular line which connects the circular line portions 28 to one another and on which the circular line portions 28 lie. In the embodiment illustrated, the circumscribed circle 34 has a diameter of 10.8 mm. The inscribed circle 36 has a diameter of 9.7 mm. The diameter of the auxiliary joining part 22, which is inserted and pressed into a sheet-like workpiece by means of the die 44, like in the embodiment already explained amounts to 10.5 mm, and thus lies between the diameter of the inscribed circle 36 and the diameter of the circumscribed circle 34 of the aperture 26.

The projections 46 are rounded at their point that protrudes furthest inward.

It is also the case in the embodiment illustrated in FIG. 10 that an area of overlap between the auxiliary joining part 22 and the die 44 becomes larger with increasing center offset of the auxiliary joining part in relation to the aperture 26.

FIG. 11 shows a partial plan view of a die 54 according to a further embodiment of the invention. The aperture 26 of the die 54 has a periphery 28, which is formed by the superposition of two polylobular circumferential lines. The periphery 28 is formed by three concavely curved portions 56 with a large curvature and three concavely curved portions 58 with a smaller curvature, wherein a respective portion 58 is disposed between two portions 56.

The portions 56 form part of a first polylobular circumferential line having three regions with a large curvature and three regions with a small curvature. The portions 56 form the regions with a large curvature of the first polylobular circumferential line.

The regions 58 form part of a second polylobular circumferential line having three regions with a large curvature and three regions with a small curvature. The regions 58 form the regions with a large curvature of the second polylobular circumferential line.

It can be seen in FIG. 11 that an imaginary circumscribed circle 34 of the aperture 26 touches the first portions 56 but not the second portions 58. At the vertex of the first portions 56, they have a radius of 10.8 mm from a center longitudinal axis 60 of the aperture 26. At the vertex of the second portions 58, they are at a distance of 10.5 mm from the center longitudinal axis 60. The die 54 is provided for inserting an auxiliary joining part 22 with a shaft diameter of 10.5 mm.

A respective inwardly protruding projection is formed at the transition between the first portions 56 and the second portions 58, wherein the point 62, at which the two portions 56, 58 adjoin one another, is furthest inward. The periphery 28 of the aperture touches an imaginary inscribed circle 36 at the points 62. In the embodiment illustrated, the imaginary inscribed circle 36 has a diameter of 10.1 mm.

Respective concave side boundaries are disposed on either side of the points 62.

The periphery 28 of the aperture 26 thus has a total of six inwardly protruding projections, the innermost points of which are each formed by the points 62. These projections are delimited on either side by concave side boundaries. If the auxiliary joining part is placed on exactly centered in relation to the aperture 26, the auxiliary joining part is deformed by the die 54 only in the vicinity of the points 62. With increasing center offset of the auxiliary joining part 22, the area of overlap between the auxiliary joining part 22 and the die 54 becomes larger. This makes it possible to achieve secure anchoring of the auxiliary joining part 22 in the workpiece even in the case of a center offset—unavoidable in series manufacture—of the auxiliary joining part 22 in relation to the die 54.

Like the die 14 of FIG. 3, the die 54 also has a ferrule 64, the inner periphery of which is defined by the periphery 28 of the aperture 26 and which has a circular, outer periphery.

As can be seen in FIG. 11, the width of the ferrule 64 varies over the circumference of the ferrule 64. This is also the case for the ferrule 40 from FIG. 3.

FIG. 12 shows the die 54 from FIG. 11 in a partial view obliquely from above. The total of six inwardly protruding projections of the periphery 28 of the aperture 26 and the vertex lines 66 of the periphery 28, which run parallel to the center longitudinal axis 60 of the aperture 26 and are defined by the position of the points 62 that were explained with reference to FIG. 11, can readily be seen.

It can also be seen in FIG. 12 that the aperture 26 is deep enough to be able to receive a punch slug, which is produced when the auxiliary joining part 22 is being inserted. The aperture 26 is generally in the form of a through-opening.

FIGS. 13 to 16 show further views of the die 14, as was already explained with reference to FIG. 3.

In the illustrations of FIG. 14 and FIG. 15, it is possible to see the ferrule 40, which is raised in relation to the rest of the top side of the die 14, in the embodiment illustrated by 0.3 mm. The circular outer periphery of the ferrule 40 is beveled, wherein the bevel has an angle of approximately 45°.

In the plan view of FIG. 16, it can readily be seen that the width of the ferrule 40 varies as seen over its circumference.

As was discussed, in the case of the dies 14, 44, 54, an area of overlap between a circular shaft of an auxiliary joining part and the contact surface of the die becomes larger with increasing center offset of the auxiliary joining part. A precondition for this is that, according to the invention, the maximum first diameter of the auxiliary joining part, that is to say the maximum diameter of the shaft of the auxiliary joining part 22 and generally the diameter of the punching portion at the lower end of the auxiliary joining part, lies between the diameter of an imaginary inscribed circle of the periphery 28 of the aperture and the imaginary circumscribed circle of the aperture. According to the invention, a diameter of the inscribed circle is between 4% and 10% smaller than the maximum first diameter of the auxiliary joining part and a diameter of the circumscribed circle is between 2% and 5% larger than the first diameter of the auxiliary joining part 22. In the embodiments illustrated, the first diameter of the auxiliary joining part is 10.5 mm in each case. The diameter of the imaginary inscribed circle 36 amounts to 9.7 mm in the case of the die 44 as per FIG. 10, and to 10.1 mm in the case of each of the dies 14 and 54 of FIGS. 9 and 11. The diameter of the imaginary circumscribed circle 34 amounts to 10.8 mm in the case of each of the dies 14, 44 and 54.

The following table gives values for the area of overlap between the auxiliary joining part 22 and the dies 14, 44, 54 for different directions of the center offset and different geometries of the periphery 28 of the respective aperture.

| Die geometry | Ø Inner circle [mm] | Ø Circumscribed circle [mm] | Ø Auxiliary joining part at the shaft [mm] | Center offset [mm] | Area of overlap between auxiliary joining part and die [mm²] |
|---|---|---|---|---|---|
| FIG. 9 | 10.1 | 10.8 | 10.5 | 0 | 2.574 |
| FIG. 9 | 10.1 | 10.8 | 10.5 | 0.1 in the direction of arrow 100 | 2.719 |
| FIG. 9 | 10.1 | 10.8 | 10.5 | 0.2 in the direction of arrow 100 | 2.949 |
| FIG. 9 | 10.1 | 10.8 | 10.5 | 0.1 in the direction of arrow 200 | 2.695 |
| FIG. 9 | 10.1 | 10.8 | 10.5 | 0.2 in the direction of arrow 200 | 3.048 |
| FIG. 10 | 9.7 | 10.8 | 10.5 | 0 | 0.486 |
| FIG. 10 | 9.7 | 10.8 | 10.5 | 0.1 in the direction of arrow 300 | 0.49 |
| FIG. 10 | 9.7 | 10.8 | 10.5 | 0.2 in the direction of arrow 300 | 0.495 |
| FIG. 10 | 9.7 | 10.8 | 10.5 | 0.1 in the direction of arrow 400 | 0.498 |
| FIG. 10 | 9.7 | 10.8 | 10.5 | 0.1 in the direction of arrow 400 | 0.503 |
| FIG. 11 | 10.1 | 10.8 | 10.5 | 0 | 1.911 |
| FIG. 11 | 10.1 | 10.8 | 10.5 | 0.1 in the direction of arrow 500 | 2.135 |
| FIG. 11 | 10.1 | 10.8 | 10.5 | 0.2 in the direction of arrow 500 | 2.805 |
| FIG. 11 | 10.1 | 10.8 | 10.5 | 0.1 in the direction of arrow 600 | 2.1 |
| FIG. 11 | 10.1 | 10.8 | 10.5 | 0.2 in the direction of arrow 600 | 2.988 |

As can be seen from the table, the area of overlap between the shaft of the auxiliary joining part and the die becomes larger with increasing center offset of the auxiliary joining part in relation to the center longitudinal axis of the aperture in the die, irrespective of the direction of the center offset. Indeed, the auxiliary joining part is consequently no longer deformed symmetrically in relation to the center longitudinal axis of the die in the event of a center offset. Since the area of overlap becomes larger, at least in certain portions in the periphery region, however, there is greater deformation than in the event of a center offset of zero. This ensures that the auxiliary joining part is always securely anchored in the workpiece even in the event of an unavoidable center offset. The device according to the invention and the method according to the invention can thereby ensure that auxiliary joining parts are inserted into workpieces in a manner reliable in terms of the process.

The invention claimed is:

1. A device for inserting an auxiliary joining part into a workpiece, having a punch for pressing the auxiliary joining part into a top side of the workpiece, wherein the auxiliary joining part has a shaft to be pressed into the workpiece and a circular circumference with a first, maximum diameter, the device further including a die for coming into contact with a bottom side of the workpiece while the auxiliary joining part is being pressed in, wherein the die comprises a contact region and an aperture surrounded by the contact region, wherein a periphery of the aperture does not have a circular shape, wherein radially outermost points of the periphery of the aperture lie on an imaginary circumscribed circle and wherein radially innermost points of the periphery of the aperture lie on an imaginary inscribed circle, wherein the periphery of the aperture comprises at least three projections protruding into the circumscribed circle of the aperture and wherein the projections touch the inscribed circle, and a diameter of the inscribed circle is between 4% and 10% smaller than the first diameter of the auxiliary joining part, and a diameter of the circumscribed circle is between 2% and 5% larger than the first diameter of the auxiliary joining part.

2. The device as claimed in claim 1, wherein each projection is formed between two side boundaries that are part of the periphery of the aperture, wherein the side boundaries of each projection form an angle of 40 degrees up to at most 180 degrees.

3. The device as claimed in claim 2, wherein the side boundaries of the projections are convex.

4. The device as claimed in claim 2, wherein the side boundaries of each projection are concave.

5. The device as claimed in claim 3, wherein the side boundaries of each projection form an angle of greater than 150 degrees.

6. The device as claimed in claim 2, wherein the side boundaries are portions of a polylobular shape of the periphery of the aperture.

7. The device as claimed in claim 6, wherein the polylobular shape has three regions with a large curvature and a small radius, and three regions with a small curvature and a large radius.

8. The device as claimed in claim 1, wherein the periphery of the aperture is formed by multiple mutually adjoining portions of two polylobular circumferential lines.

9. The device as claimed in claim 8, wherein tat a portion of the first polylobular circumferential line with a smaller radius and a larger curvature adjoins a portion of the second polylobular circumferential line with a larger radius and a smaller curvature.

10. The device as claimed in claim 8, wherein a first of the two polylobular circumferential lines and a second of the two polylobular circumferential lines time are offset by a predefined angle about a center longitudinal axis of the aperture.

11. The device as claimed in claim 10, wherein the first and second polylobular lines are offset by an angle of 60 degrees in relation to the center longitudinal axis.

12. The device as claimed in claim 8, wherein the two polylobular circumferential lines each have three regions with a large curvature and a small radius, and three regions with a small curvature and a large radius.

13. The device as claimed in claim 8, wherein the two polylobular circumferential lines each have an imaginary circumscribed circle, and the diameters of the circumscribed circles are not the same.

14. The device as claimed in claim 13, wherein the diameters of the circumscribed circles differ by three percent to ten percent.

15. The device as claimed in claim 1, wherein a diameter of the imaginary circumscribed circle of the aperture is between 10 mm and 11.6 mm, in particular amounts to 10.8 mm.

16. The device as claimed in claim 1, wherein the aperture is in the form of a through-opening through the die and is provided to discharge a punch slug that is produced when the auxiliary joining part is being pressed in.

17. The device as claimed in claim 1, wherein the periphery of the aperture is sharp-edged, beveled or rounded.

18. The device as claimed in claim 1, wherein the die has a ferrule facing toward the bottom side of the workpiece, an inner periphery of the ferrule forming the periphery of the aperture, and the ferrule protrudes beyond the rest of the top side of the die that faces toward the bottom side of the workpiece, is at the same height as the top side of the die, or is offset with respect to the top side of the die.

19. The device as claimed in claim 18, wherein a height, or a level, of the ferrule, as seen over its circumference, is constant and a width of the ferrule, as measured in a radial direction parallel to the top side of the die, varies over the circumference.

20. The device as claimed in claim 19, wherein an outer periphery of the ferrule is circular.

21. A method for inserting an auxiliary joining part into a workpiece with a device as claimed in claim 1, the method having the following steps: bringing a die into contact with a bottom side of the workpiece, placing the auxiliary joining part onto a top side of the workpiece, pressing the auxiliary joining part into the top side of the workpiece by means of with a punch, punching a punch slug out of the workpiece with the auxiliary joining part while the auxiliary joining part is being pressed in, and deforming the auxiliary joining part with a contact region of the die.

22. An arrangement having an auxiliary joining part, a workpiece, and a device as claimed in claim 1.

* * * * *